United States Patent [19]

Bliss

[11] Patent Number: 5,037,014

[45] Date of Patent: Aug. 6, 1991

[54] ROTARY FEEDER

[76] Inventor: William L. Bliss, R.R. #1, Box 232, Newkirk, Okla. 74647

[21] Appl. No.: 516,671

[22] Filed: Apr. 30, 1990

[51] Int. Cl.$^5$ .............................................. G01F 11/00
[52] U.S. Cl. ..................................... 222/410; 222/368
[58] Field of Search ............... 222/311, 312, 316, 367, 222/368, 410, 414; 137/99.5

[56] References Cited

U.S. PATENT DOCUMENTS

| | | | |
|---|---|---|---|
| 1,069,527 | 8/1913 | Carman | 222/368 |
| 2,475,381 | 7/1949 | Erickson | 222/368 |
| 2,684,788 | 7/1954 | Bland | 222/368 |
| 3,432,884 | 3/1969 | Lysakowski et al. | 222/414 |
| 3,606,965 | 12/1972 | Cortelyou et al. | 222/312 |
| 3,794,215 | 2/1974 | Osterhaus | 222/410 |
| 4,232,717 | 11/1980 | Allgaier et al. | 222/368 |
| 4,238,058 | 12/1980 | Heth | 222/368 |
| 4,259,912 | 4/1981 | Stocks et al. | 222/414 |
| 4,892,233 | 1/1990 | Zelickson | 222/368 |
| 4,957,219 | 9/1990 | Robbins et al. | 222/368 |

FOREIGN PATENT DOCUMENTS 2087366 5/1982 United Kingdom ................ 222/410

Primary Examiner—Michael S. Huppert
Assistant Examiner—Anthoula Pomrening

[57] ABSTRACT

An impeller for metering material from an input to an output is mounted on a central shaft. The impeller is formed by a hub, a disc formed with the central hub and extending normal to the rotational axis of the hub. A plurality of spaced first vanes is formed with the disc and extends from the periphery of the disc to the hub. A second plurality of spaced vanes is attached intermediate the first vanes to the disc and extends from the periphery of the disc to a location intermediate the periphery and the hub. The back of the disc has a plurality of slots which will mate with both the first and second vanes of a preceding impeller. An adapter disc is also provided which has a plurality of radial slots on both surfaces of the disc which mate with the vanes of the previously described impeller. When the adapter disc is placed on the shaft and mated with the vanes of the preceding impeller, a last or reversed impeller can be put on by reversing the impeller so that the vanes extend toward the adapter disc thus locking in the entire impeller with slots in each succeeding and preceding impeller.

In addition to the above, a pair of keyways is provided in each hub. One keyway aligns with the long vane and a second keyway aligns with the short vanes. In this regard then, the long and the short vanes can be staggered axially down the impeller shaft.

10 Claims, 2 Drawing Sheets

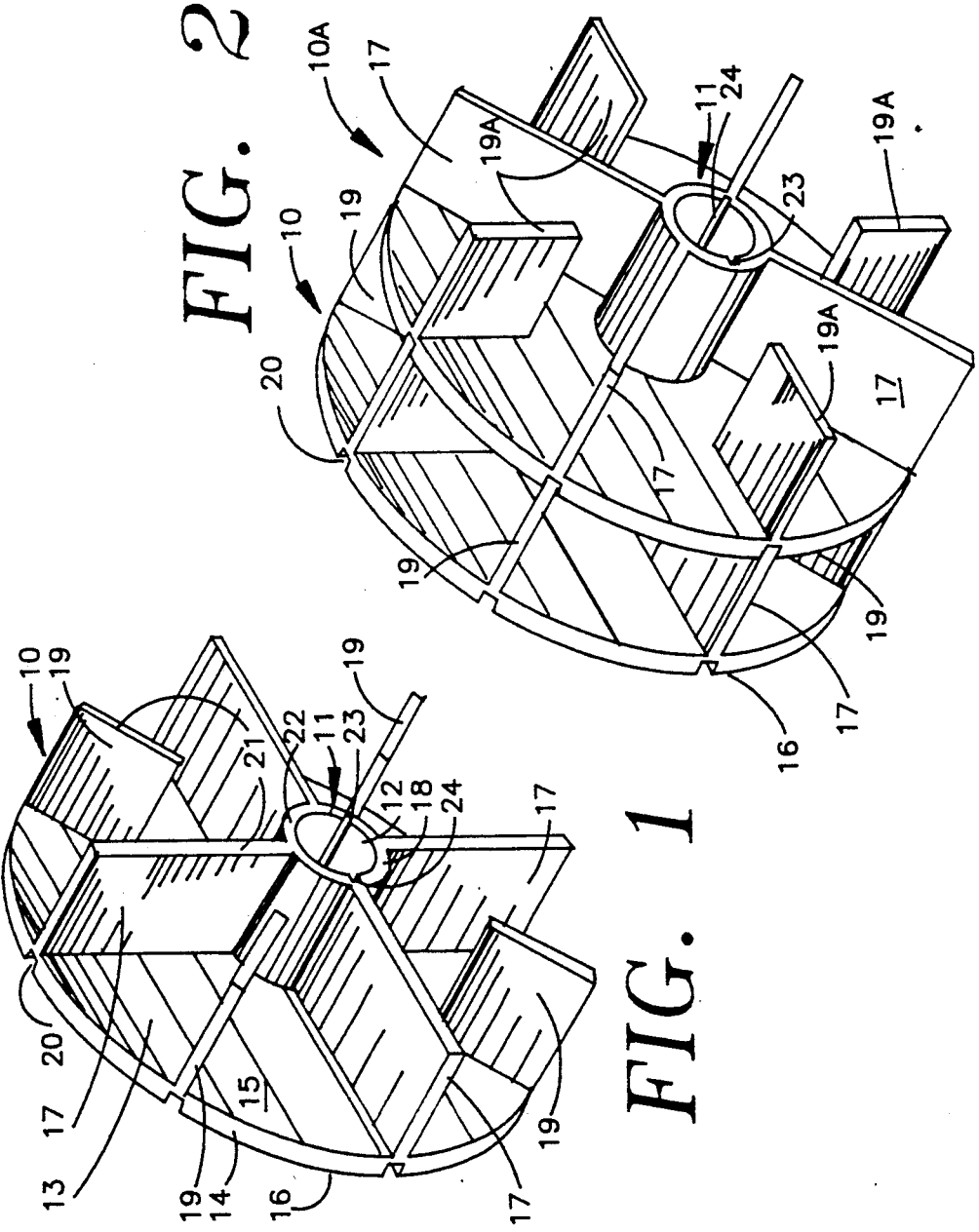

ROTARY FEEDER

BRIEF DESCRIPTION OF THE PRIOR ART

The best prior art known to applicant is U.S. Pat. No. 2,475,381 issued July 5, 1949, to J. A. Erickson and U.S. Pat. No. 3,606,965 issued Sept. 21, 1971, to C. E. Cortelyon, et al. The Erickson patent describes a feed device for mills for metering grain from an inlet hopper to an outlet and essentially comprises a shaft having a pair of impellers mounted thereon. One impeller is staggered in location from the second impeller. The patent to Cortelyou, et al, illustrates a plurality of impellers having discs between the impellers each of which is mounted on axially on a shaft. The impellers are used for metering pulverized material from the inlet to the outlet of a mill.

BRIEF DESCRIPTION OF THE INVENTION

This invention describes a novel impeller for metering pulverized material from an inlet to an outlet in a mill, for example. The impeller is unique in that it is molded from a single piece of plastic. In order to provide rigidity to the plastic during normal use, the succeeding impeller has a plurality of radial slots adapted to recieve the impeller blades from the preceding impeller so that the impeller vanes will lock rigidly into the succeeding impeller. In order to support the last impeller, a coupling disc is provided which has slots on both sides of the disc. This disc is adapted to receive the preceding impeller into slots on one side of the adapter disc and the vanes from a reversed impeller on the other side of the adapter disc. The end impeller will have its vanes locked rigidly into the adapter plate thereby providing sufficient structural strength for a plastic impeller. A central recess is provided to accept the hub along with the extending vanes.

The entire impeller is formed of a polyethylene or polypropylene plastic. The above mentioned plastics have a decided advantage over making the impellers out of metal since the plastics are very tough and very slick. Therefore, the material being metered through the impeller will not stick to the impeller blades causing jamming or filling of the impeller blades by the material passing through. The long and short arrangement of the impellers also provides an added advantage for permitting the material to flow more evenly through the impeller particularly if the material is of a larger size.

BRIEF DESCRIPTION OF THE FIGURES

FIG. 1 is an isometric view of an impeller blade;

FIG. 2 is an isometric view of a pair of joined impeller blades; and,

DETAILED DESCRIPTION OF THE INVENTION

Figure 3:
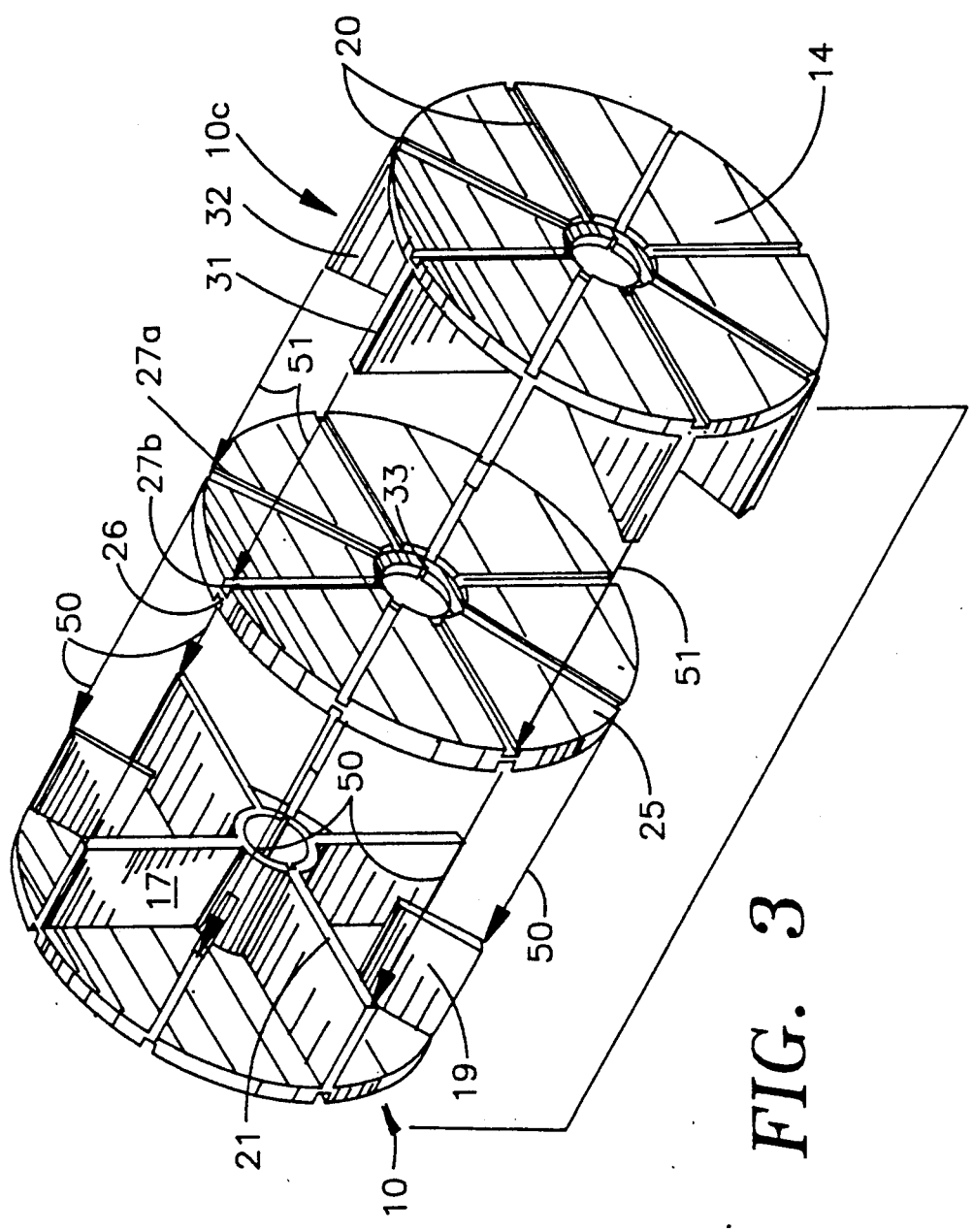
FIG. 3 is an expanded view of an impeller, a coupling disc and a reversed impeller.

Referring to all of the figures but in particular to FIG. 1, an impeller referred to generally by arrow 10 is illustrated. Impeller 10 has a central hub referred to by an arrow 11 and has an axial opening 12 therethrough. Axial opening 12 is adapted to recieve a shaft used to turn impeller 10. A disc 13 is formed with hub 11 and has a periphery 14, an inner surface 15 and an outer surface 16 formed continuous with disc 14 and hub 11.

A plurality of long vanes 17 extend from periphery 14 to the outer surface 18 of hub 11. In the particular embodiment illustrated, there are four long vanes 17 illustrated. The use of four vanes is merely for convenience and better illustrates the placement of the vanes with the hub and the disc. It is obvious that many more than four vanes can be incorporated and is still be well within the scope of this invention. For example, the preferred embodiment has a minimum of eight long vanes and a like number of the shorter vanes to be described.

A plurality of shorter vanes 19 extends from periphery 14 to a location intermediate the periphery 14 and the outer surface 18 of hub 11. Preferably these vanes are approximately one-half the length of longer vanes 17. A plurality of radial slots 20 is formed in surface 16 of disc 13. These slots extend a length sufficient to permit the outer edge 21 of both the short 19 and the long 17 vanes to mate therein. A recess is also provided to accept the outer edge 22 of hub 11, (see FIG. 3).

One of the unique features of this molded unit is the ability to properly orient the long 17 and the short 19 vanes with respect to each other. Referring to FIG. 2, it can be shown that long vanes 17 is aligned with the short vane 19A in a subsequent impeller 10A. In order to accomplish the above, a unique plurality of keyway slots 23 and 24 are provided in hub 11. It should be here noted that keyway slot 23 is aligned with short vane 19 and keyway slot 24 is aligned with long vane 17. Thus, with a shaft having a single keyway, the vanes can be aligned with the long vanes 17 and the short vanes 19 in alignment as illustrated in FIG. 2 merely by aligning keyway slot 23 with the keyway in the shaft for impeller 10 and keyway 24 in the keyway of the shaft for impeller 10A. In order to accomodate and support the end impeller, a unique adapter disc is provided. Referring to FIG. 3, adaptor disc 25 has a plurality of slots 26 on one face and slots 27a and 27b, for example, on the other face. Slots 26 will mate with vanes 17 and 19 when disc 25 is moved in the direction of arrows 50. Ends 21 will fit into slots 26. A second impeller 10c is reversed 180° on its axis so that vanes 31 and 32 are facing adaptor disc 25. Impeller 10c is then moved in the direction of arrows 51 until impeller vanes 31 and 32, for example, mate with slots 27b and 27a respectively. All of the impellers will then be interlocked and secure.

OPERATION

In normal operation, the feed apparatus is constructed by placing a plurality of impellers 10, 10A, etc., along a shaft (not illustrated) having a single keyway (not illustrated). Such an impeller assembly is formed by placing the key in the keyway on the shaft into slot 23 for example. Then a second impeller, 10A, is placed on the shaft so that its keyway 24 is aligned with the keyway on the shaft. Such an assembly will then cause the long vane 17 to be aligned with the short vane 19A (as illustrated in FIG. 2). Once a sufficient number of impellers 10 and 10A have been assembled on the shaft, then adapter disc 25 is placed on the shaft. Its keyway slot 33 will pass onto the shaft and its keyway, and slide up to and engage vanes 17 and 19 which will pass into slots 26 anchoring the outer edges 21 of vane 17 and 19 into adapter disc 25. A reversed impeller 10C is then inserted on the disc so that its long vane 31 is properly aligned with a short vane 19 of the preceding impeller 10. It is obvious that several additional reversed impellers 10C can be placed on the shaft without deteriorating from the operation of the impeller since each of the reverse shafts will be securely anchored into either the slots 27A and 27B in adapter 25 or in slots 20 in disc 14 of impeller 10C for example.

The plastic used to mold each of the discs provides an extremely strong unitary impeller which is also very slippery, thereby providing for ease in discharging the material once it falls into the impeller.

CONCLUSIONS

A unique impeller has been shown that can be assembled into a large feed assembly for accomodating movement of grain from an input to an output through a series of impellers. The impellers are manufactured from a single unitary plastic and are interlocked so that they are extemely strong during normal use.

It is obvious that other modifications, changes and variations can be made and still be within the spirit and scope of this invention as described in the specification and appended claims.

What I claim is:

1. An impeller for a mill for metering materials comprising a central hub; a disc formed with said central hub and extending normal to the rotational axis of said hub, said disc having an outer periphery and an inner and outer surface; a plurality of spaced first vane means having an inner and outer edge, said inner edge formed with said disc and said hub, said disc having an outer periphery and an inner and outer surface; a plurality of spaced first vane means having an inner and outer edge, said inner edge formed with said disc and said hub and extending radially from said periphery to said hub; a plurality of second vane means spaced between said first vane means, said second vane means having an inner and outer edge, said inner edge formed with said disc and extending from said periphery to a location intermediate said periphery and said hub; a plurality of radial slots formed in the outer surface of said disc and dimensioned to receive the outer edge of said first and second vane means of a second mating impeller when said second mating impeller is positioned adjacent to said impeller first mentioned.

2. Apparatus as claimed in claim 1 wherein said first vane means is aligned with said second vane means in said succeeding impeller.

3. Apparatus as described in claim 1 wherein said central hub includes an inner axial opening for receiving a shaft means and wherein first and second key slot means are axially aligned with said first and second vane means respectively whereby a single keyway slot in said shaft means can properly orient each of said vane means.

4. Apparatus as claimed in claim 1 wherein said hub, disc and first and second vane means are molded as a single unit from polyethelyne.

5. Apparatus as claimed in claim 1 wherein said hub, disc and first and second vane means are molded as a single unit from polypropyline.

6. Apparatus as claimed in claim 1 including a shaft means having a plurality of impellers there along each spaced adjacent each other in a manner to force each outer edge of each vane means into an adjacent mating radial slot in said adjacent disc, disc coupling means having a hub means for receiving said shaft means, an inner and outer surface means and a periphery; radial slot means formed in both said inner and outer surface means; said radial slot means formed in said inner and outer surface means mating with the outer edges of said vane means on said adjacent impellers, a last impeller mounted on said shaft means with said disc and vane means oriented 180° from said plurality of impellers, said last impeller's outer edge of said vane means mating with said radial slot means in said outer surface of said disc coupling means.

7. Apparatus as claimed in claim 6 wherein said first vane means is aligned with said second vane means in said succeeding impeller.

8. Apparatus as claimed in claim 6 wherein said hub means includes an inner axial opening for receiving a shaft means and wherein first and second keyway slot means are axially aligned with said first and second vane means respectively whereby a single keyway slot in said shaft means can properly orient each of said vane means.

9. Apparatus dependent on claim 6 wherein said hub, disc and first and second vane means are molded as a single unit from polyethelyne.

10. Apparatus dependent on claim 6 wherein said hub, disc and first and second vane means are molded as a single unit from polypropyline.

* * * * *